US011245143B2

(12) United States Patent
Krishnan et al.

(10) Patent No.: US 11,245,143 B2
(45) Date of Patent: Feb. 8, 2022

(54) ELECTROCHEMICAL CELL HAVING ORTHOGONAL ARRANGEMENT OF ELECTRODES

(71) Applicant: Form Energy, Inc., Somerville, MA (US)

(72) Inventors: Ramkumar Krishnan, Scottsdale, AZ (US); Joel Ryan Hayes, Chandler, AZ (US); Todd Trimble, Phoenix, AZ (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

(21) Appl. No.: 16/402,704

(22) Filed: May 3, 2019

(65) Prior Publication Data

US 2019/0348729 A1    Nov. 14, 2019

Related U.S. Application Data

(60) Provisional application No. 62/669,694, filed on May 10, 2018.

(51) Int. Cl.
*H01M 12/02* (2006.01)
*H01M 4/38* (2006.01)
*H01M 12/08* (2006.01)

(52) U.S. Cl.
CPC ............. *H01M 12/02* (2013.01); *H01M 4/38* (2013.01); *H01M 12/08* (2013.01)

(58) Field of Classification Search
CPC .. H01M 2004/021; H01M 12/02; H01M 4/38; H01M 12/08
See application file for complete search history.

(56) References Cited

U.S. PATENT DOCUMENTS

| 2012/0015264 A1* | 1/2012 | Friesen | ................. H01M 50/70 429/415 |
| 2014/0162096 A1* | 6/2014 | Lex | ......................... B29B 9/06 429/81 |

(Continued)

FOREIGN PATENT DOCUMENTS

| GB | 1238356 A | 7/1971 |
| WO | 2012/156972 A1 | 11/2012 |
| WO | 2016/197109 A1 | 12/2016 |

OTHER PUBLICATIONS

International Search Report PCT/US2019/031118 dated Aug. 29, 2019 (4 pgs.).

(Continued)

*Primary Examiner* — Matthew T Martin
*Assistant Examiner* — Jessie L. Walls
(74) *Attorney, Agent, or Firm* — Pillsbury Winthrop Shaw Pittman, LLP

(57) ABSTRACT

An exemplary electrochemical cell incorporates at least a first battery electrode, such as a zinc electrode, at least a second battery electrode, such as a reversible metal electrode such as nickel, and at least an oxidant reduction electrode, such as an air cathode. The oxidant reduction electrode(s) is configured in a cell housing such that it is essentially orthogonal to the first and second electrodes. The cell housing contains electrolyte therein and the electrodes are immersed, at least partially, in the electrolyte. The positioning of the oxidant reduction electrode(s) on the side of the cell and relatively perpendicular to the first and second (metal) electrodes, allows for more consistent ionic resistance across all the metal electrodes. Optionally, a fourth or oxygen evolving electrode may be provided in the cell (Continued)

housing, horizontal, orthogonal, and below the first and second electrodes to provide oxygen bubbles for mixing the electrolyte.

28 Claims, 15 Drawing Sheets

(56) References Cited

U.S. PATENT DOCUMENTS

| | | | | |
|---|---|---|---|---|
| 2017/0170451 A1* | 6/2017 | Englert | ............... | H01M 4/463 |
| 2017/0352936 A1* | 12/2017 | Jin | ................... | H01M 12/065 |
| 2018/0145383 A1* | 5/2018 | Krishnan | .......... | H01M 10/0413 |
| 2020/0266423 A1* | 8/2020 | Kitagawa | ............. | H01M 4/134 |
| 2020/0280064 A1* | 9/2020 | Takahashi | ............... | H01M 4/48 |

OTHER PUBLICATIONS

Written Opinion of the International Searching Authority PCT/US2019/031118 dated Aug. 29, 2019 (9 pgs.).

* cited by examiner

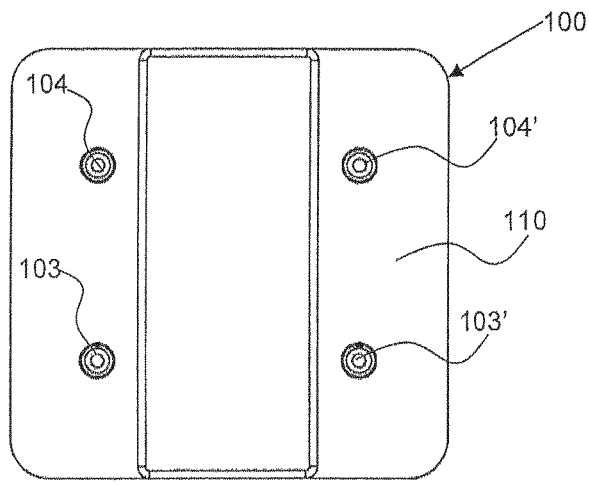
FIG. 2
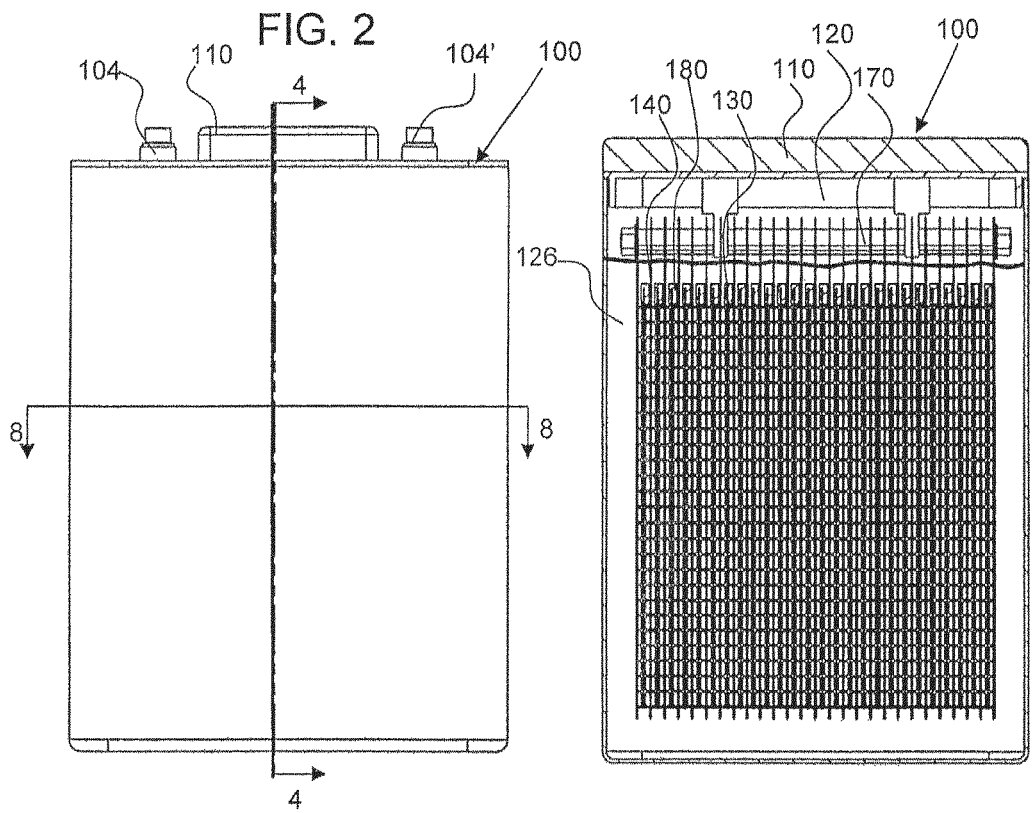
FIG. 3
FIG. 4

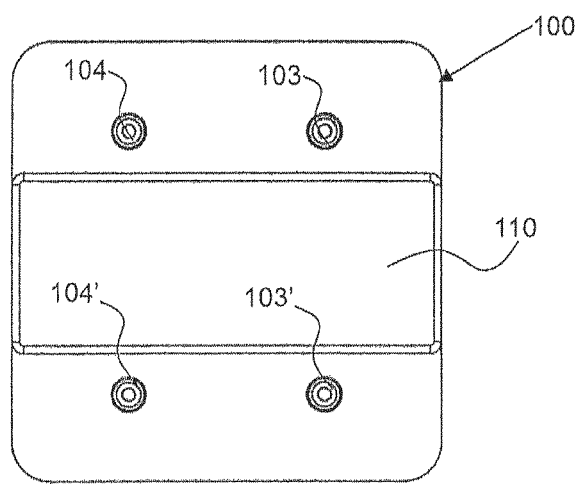
FIG. 5
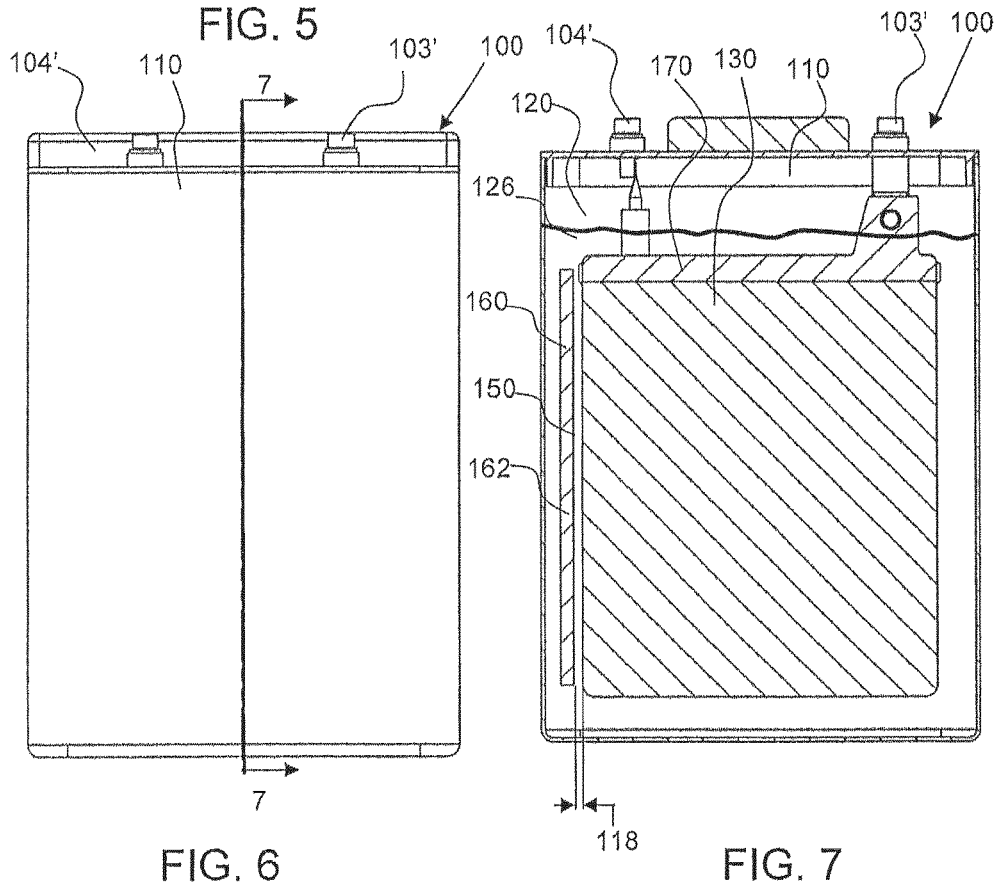
FIG. 6
FIG. 7

| Electrode | Type | Mode | | | | | |
|---|---|---|---|---|---|---|---|
| | | Primary Discharge | Primary Charge | Top, Bottom Balancing | Nickel Balancing | Bleed Balancing | Stirring |
| 1st | Anode (Zn on metal screen) | -, Load | -, Power Supply | -, Load | | -, Power Supply, Load | |
| 2nd | Cathode (Reversible metal species, Ni) | +, Load | +, Power Supply | | +, Power Supply | +, Power Supply | |
| 3rd | Oxidant reduction electrode (Air cathode) | | | +, Load | -, Power Supply | +, Load | -, Power Supply |
| 4th | Oxygen evolving electrode/catch tray (metal screen) | | | | | | +, Power Supply |

FIG. 20

ELECTROCHEMICAL CELL HAVING ORTHOGONAL ARRANGEMENT OF ELECTRODES

CROSS REFERENCE TO RELATED APPLICATION

This patent application claims priority to provisional patent application 62/669,694 filed on May 10, 2018. The subject matter of each of these applications is incorporated by reference herein in its entirety.

BACKGROUND

Field of the Invention

The present invention relates to an electrochemical cell having an orthogonal arrangement of electrodes.

Background

Rechargeable Nickel-Zinc batteries are low cost batteries with high round-trip efficiency. In a Nickel-Zinc battery, the anode is zinc and the cathode is nickel. The discharge reactions of a nickel-zinc battery are:

Anode: $Zn+4OH^- \rightarrow Zn(OH)_4^{2-}+2e^-$ (−1.24 V)

Cathode: $2NiOOH+2H_2O+2e^- \rightarrow 2Ni(OH)_2+2OH^-$ (0.49 V)

Overall: $2NiOOH+Zn+2H_2O \rightarrow 2Ni(OH)_2+Zn(OH)_2$ (1.73V)

Charge balance between the zinc anode and the nickel cathode should be maintained during cycling for proper battery function (herein "zinc" refers to metallic zinc in a reduced state on or in the battery anode structure and "nickel" refers to nickel hydroxide in a discharged state or nickel oxy-hydroxide in a charged state in or on the cathode structure). The Faradaic charge-discharge efficiency of zinc is generally 95 to 98% but only 90 to 95% for nickel. Therefore, in one charge-discharge cycle, up to 8% excess zinc may remain on the anode. This residual zinc can build up over multiple cycles and result in low cycling efficiency, poor discharge behavior, and possible formation of zinc dendrites that cause cell shorting.

SUMMARY

This invention pertains to a structure and method that, in one non-limiting application, may be used to manage the above-described excess zinc capacity on the anode formed during normal cell cycling due to the Faradaic efficiency difference between the zinc and nickel hydroxide. The invention is not limited to zinc and nickel as being the anodic and cathodic reactant materials, and may be used with other materials as well.

An exemplary electrochemical cell of this disclosure includes: a cell housing for retaining a volume of an electrolyte therein; at least one first battery electrode provided in the cell housing; at least one second battery electrode provided in the cell housing; and an oxidant reduction electrode provided in the cell housing with an interior surface contacting the electrolyte and an exterior surface for exposure to oxygen. The oxidant reduction electrode is oriented essentially orthogonally to said at least one first and second battery electrodes.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 2 shows a top down view of the electrochemical cell shown in FIG. 1 at a first orientation.

FIG. 3 shows a front view of the electrochemical cell shown in FIG. 1 as indicated by arrow A.

FIG. 4 shows a cross-sectional view of the electrochemical cell shown in FIG. 3 along line 4-4.

FIG. 5 shows a top down view of the electrochemical cell shown in FIG. 1 at a second orientation.

FIG. 6 shows a front view of the electrochemical cell shown in FIG. 1 as indicated by arrow B.

FIG. 7 shows a cross-sectional view of the electrochemical cell shown in FIG. 6 along line 7-7.

FIG. 20 shows a chart illustrating different modes that may be implemented on an electrochemical cell in accordance with an embodiment.

Figure 1:
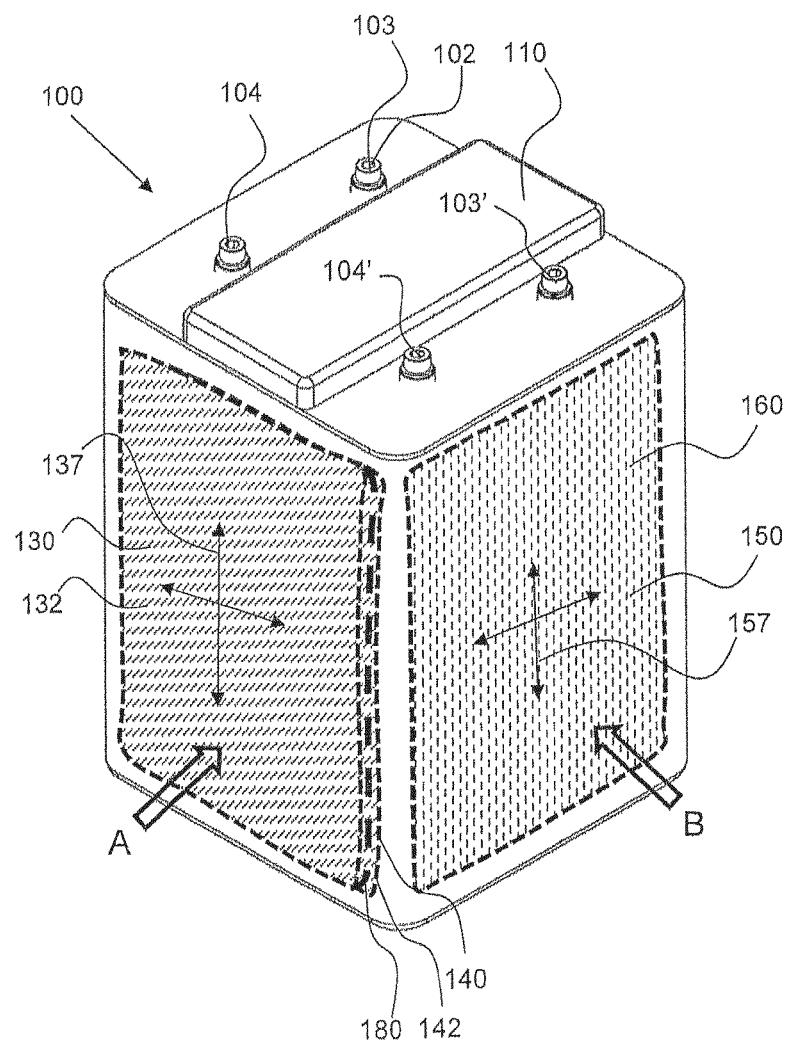
FIG. 1 shows a perspective view of an exemplary electrochemical cell having an oxidant reduction (air) electrode that is orthogonal to a first electrode which is part of an electrode assembly, in accordance with an embodiment of this disclosure.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

The term oxidant reduction electrode is used interchangeably with oxidant electrode, oxidant reducing electrode, air electrode, and/or air cathode.

The term first battery electrode is used interchangeably with first electrode.

The term second battery electrode is used interchangeably with second electrode. The first and second electrodes are electrodes of opposite polarity, e.g., the first electrode has an anodic potential to oxidize its active reactant (e.g., metallic zinc) during standard discharge and a cathodic potential to reduce an oxidized species back to the active reactant during standard charge, and the second electrode does the opposite on its active reactant (e.g., nickel oxyhydroxide to nickel oxide during discharge and the reverse during charge).

In an embodiment, an exemplary electrochemical cell 100 includes at least a first battery electrode 130 having a metal ionic species for reaction, such as a zinc electrode, and at least a second battery electrode 140, which may be a reversible metal electrode such as nickel hydroxide. The first battery electrode 130 may be considered the anode of the battery and the second battery electrode 140 may be considered the cathode, referring to their respective functions during standard discharging. At least one oxidant reducing electrode 150, such as an air cathode. As further described with reference to the Figures below, the oxidant reducing electrode(s) is positioned orthogonal to the first and second electrodes. The first and second electrodes may be planar and extend substantially parallel to one another.

The first electrode 130, or anode, may be a woven screen, perforated metal sheet, expanded metal screen, and may be planar or be corrugated or pleated. In an exemplary embodiment, a first or second electrode has a first corrugated portion and a second corrugated portion that are configured attached to each other and have corrugation axes that are offset from each other, as described in U.S. Patent Application No. 62/410,852, to NantEnergy, Inc., which is hereby incorporated by reference in its entirety. A large surface area may be preferred for a first electrode to allow for uniform deposition of the metal thereon. The first electrode may comprise or be made out of zinc. The second electrode, or reversible metal electrode, may be a metal screen, such as a nickel screen or sheet, or nickel-plated screen or sheet. The second electrode may be a solid-state electrode of a reversible metal or metal oxide that is oxidized to higher oxidation states or reduced to lower oxidation states to transfer charges. For example, a nickel electrode may be used, where the higher oxidation state is nickel oxyhydroxide and the lower oxidation state is nickel hydroxide. An exemplary electrolyte contains metal ions, such as zinc ions that are subsequently plated as metal zinc on the first electrode and oxidized back to zinc ions.

As shown in FIG. 1, the exemplary electrochemical cell 100 has a cell housing 110 that has a top or cover with a plurality of electrode terminals 102 including a first terminal 103 connected to each first battery electrode 130, and a second terminal 104 connected to each second battery electrode 140 (not shown in FIG. 1, but shown in FIG. 4). The cell terminals may be referred to in conventional nomenclature as the negative 103 and positive 104 terminals, denoting their usage during standard discharging. However, it should be understood that the polarity may be reversed when current is applied thereto for charging operations, and thus reference to the negative and positive terminals is not intended to be limiting for all operational modes.

Figure 8:
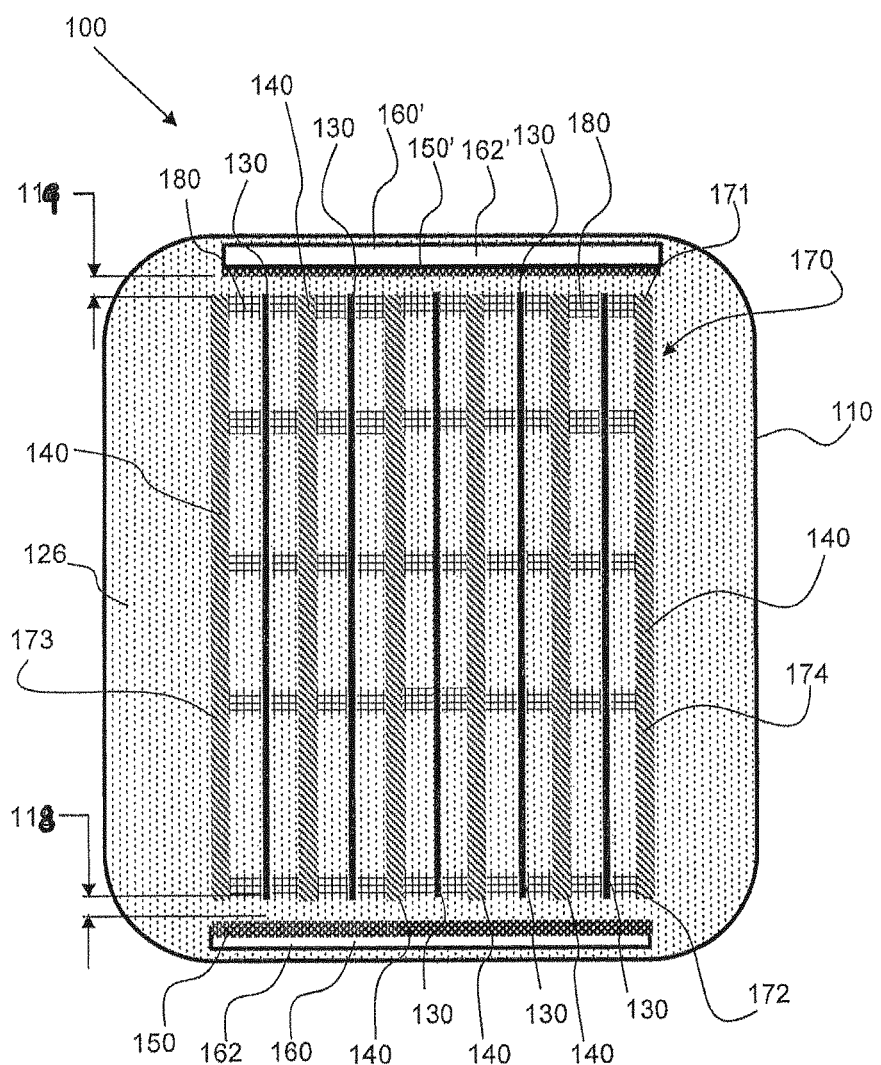
FIG. 8 shows a cross-sectional view of the electrochemical cell shown in FIG. 3 along line 8-8.

Cell housing 110 has, as shown in FIG. 4, a cell chamber 120 (or "electrolyte chamber") within its body for receipt of electrodes and a volume of an electrolyte therein. Each of the first and second battery electrodes 130, 140 within cell 100 may include a body (e.g., screen, sheet, or plate) having a first side and a second side, which extends in a corresponding electrode plane, each plane extending from a first side edge to a second side edge and from a top edge to a bottom edge relative to the electrode. The electrochemical cell 100 also has at least one oxidant reduction electrode 150 for reducing a gaseous oxidant. The oxidant reduction electrode(s) 150 may include a body having a first side and a second side, which extends in a corresponding plane, each plane extending from a first side edge to a second side edge and from a top edge to a bottom edge relative to the electrode. As shown in FIG. 8, for example, each oxidant reduction electrode 150 has an interior surface or cell side or face, e.g., facing and contacting the electrolyte within the housing 110, and an exterior surface or air side or face, e.g., facing and exposed to oxygen or air in an air chamber 162. In some embodiments, the air electrode 150 can form part of an external face of the housing 110, and thus is exposed to ambient air or another source of gaseous oxidant located outside the housing 110.

Referring back to FIG. 1, the oxidant reduction electrode(s) 150 of the electrochemical cell 100 extends along an oxidant plane 157, as indicated by crossed-double arrowed lines, and a first electrode 130, such as a zinc electrode comprising zinc, that extends along a first electrode plane 137, also indicated by crossed-double arrowed lines. The first electrode plane 137 is orthogonal or essentially orthogonal to the oxidant reduction electrode plane 157. The oxidant reduction electrode(s) 150 is configured in an oxidant electrode module 160, wherein it is contained within the housing and has an air chamber 162, which may be seen in FIGS. 7 and 8, for example.

More specifically, the illustrated first electrode 130 and first electrode plane 137 in FIG. 1 are representative of the positioning of the first and second electrodes 130, 140 in an electrode assembly, in accordance with one embodiment, that is provided within the cell housing 110. That is, a series of alternating first and second electrodes 130, 140 are provided within an assembly, better shown in FIGS. 8 and 9, for example, in the cell chamber 120 in the manner shown by first electrode 130 in FIG. 1, in one embodiment. In the cell chamber 120, each second electrode 140 extends along a second electrode plane, which is parallel or substantially parallel to the first electrode plane 137. Further, the second electrode plane is also orthogonal or essentially orthogonal to the oxidant plane 157. Moreover, in accordance with one embodiment, first and second oxidant reduction electrodes 150 are provided. Oxidant reduction electrodes may be positioned on either side of the cell and relatively perpendicular to the first and second (metal) electrodes (e.g., a second oxidant reduction electrode may be positioned on an opposite, outer side of the electrode 130, as shown in FIG. 1; see also FIG. 8). This configuration in the cell 100 allows for more consistent ionic resistance (also referred to as IR loss) across all the electrodes.

In another embodiment, a single oxidant reduction electrode 150 is provided in the cell housing.

Figure 11:
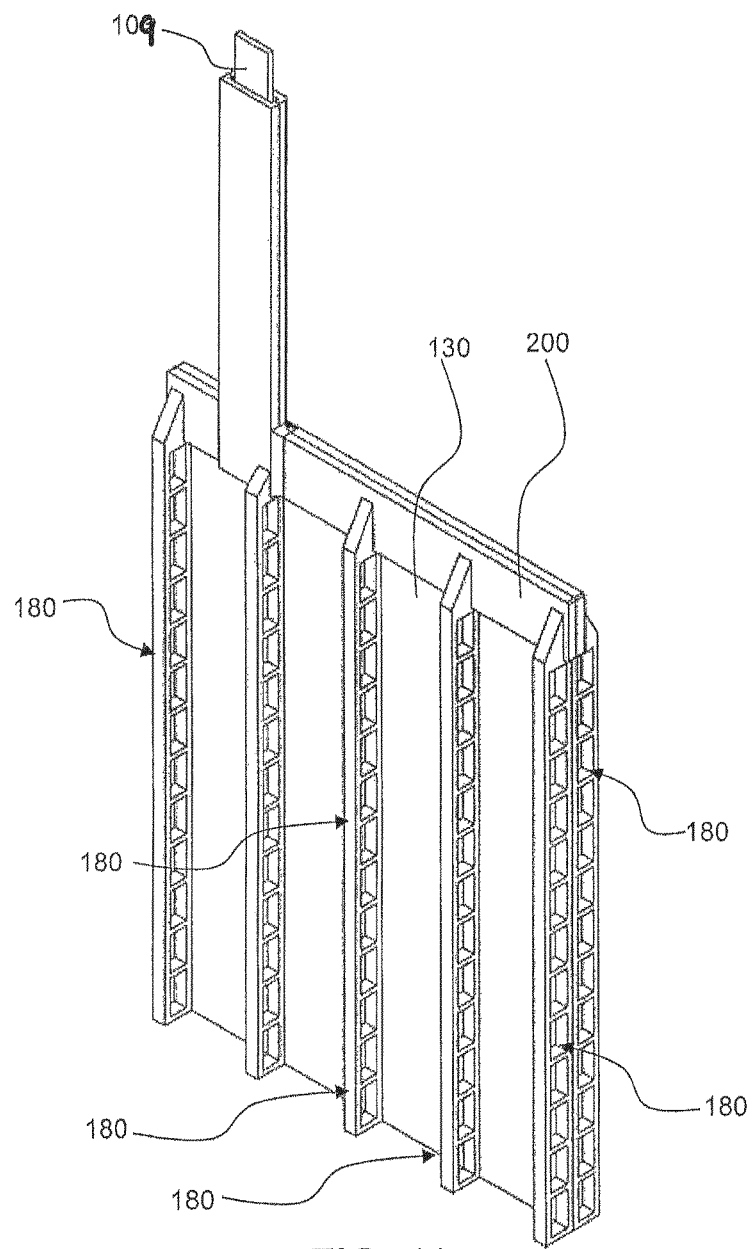
FIG. 11 shows an isometric view of the first electrode and spacers used in the electrode assembly as shown FIG. 9, in accordance with an embodiment.
Figures 12, 13:
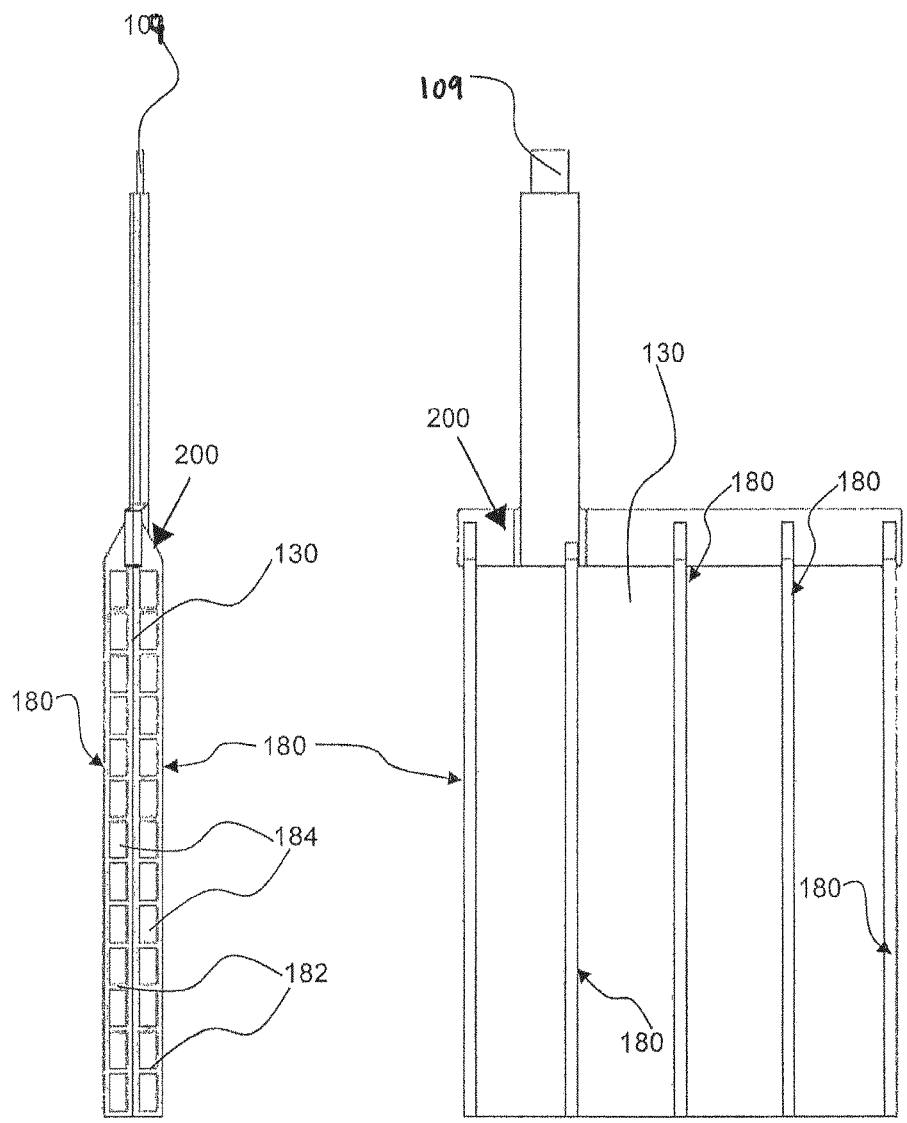
FIGS. 12 and 13 show an end view and a side view, respectively, of the first electrode and spacers of FIG. 11.

As used herein, an electrode assembly refers to a number or set of first electrodes 130 and a number or set of second electrodes 140 arranged substantially parallel or parallel to each other. Spacers, such as non-conductive spacers 180, may be provided between the first and second electrodes. The assembly is designed to be positioned such that the planes (137) of the electrodes 130, 140 are substantially orthogonal or orthogonal to the plane 157 of the oxidant reduction (air) electrode 150. In an embodiment, the first electrodes 130 are attached to a first bus bar and the second electrodes 140 are attached to a separate, second bus bar. A bus bar 105, 107 connects all the electrodes (130 or 140, respectively) together for collection or application of current from the respective terminals 103, 104. The bus bar 105 for the first electrodes 130 is connected directly or indirectly to the negative terminal 103 and the bus bar 107 for the second electrodes 140 is connected directly or indirectly to the positive terminal 104. FIGS. 11-13 show an exemplary approach where tabs 109 extend from the electrodes for connection to a respective bus bar. The bus bars 105, 107 may be contained in a cover or top part of the cell housing, for example. In an embodiment, the electrode assembly may be held together by the bus bars and/or an external mechanism or constraint, such as via the cell bucket or chamber or housing itself (e.g., the internal walls of the chamber or housing), or a strap or band or compression plate. The use of bus bars is optional, and the electrodes 130, 140 can be connected by other connections, either collectively together or they can each be connected individually by switches or the like.

Additional configurations of electrode assemblies arranged within a cell housing 110 are shown and described later with reference to FIGS. 15-16.

Figure 9:
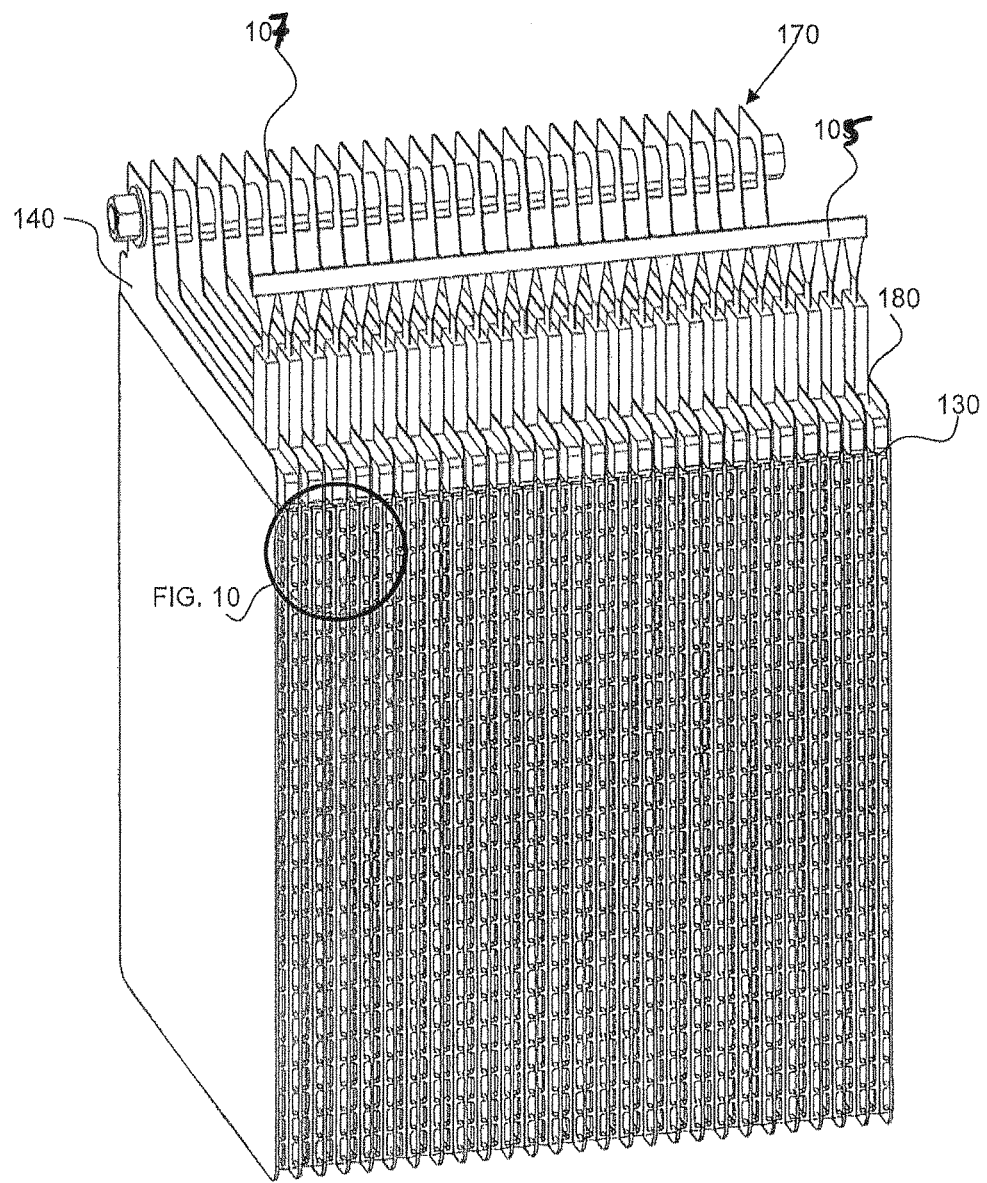
FIG. 9 shows an electrode assembly comprising first and second electrodes configured in an electrode stack for use in the cell of FIG. 1 in accordance with an embodiment.

Referring now to FIGS. 2, 3 and 4, in accordance with an embodiment, the exemplary electrochemical cell 100 has an electrode assembly 170 configured within the cell housing 110 and within the cell chamber 120. FIG. 9 shows an example of the electrode assembly 170 out of the housing 110. The assembly 170 is formed by a stack of electrodes 130, 140 that may be bound and/or compressed together, and that are connected at the top with a bus bar attached to each electrode. Specifically, in one embodiment, the first electrodes 130 and second electrodes 140 are arranged in an alternating manner in the electrode assembly, such that the first electrodes 130 are positioned between second electrodes 140. Adjacent electrodes 130, 140 may be separated by spacers (described later). In accordance with an embodiment, the assembly 170 is configured to hang from the top of the cell via the external contacts provided by terminals 103, 104. The electrode assembly 170 is submerged, at least partially, within an electrolyte 126 provided or retained within the chamber 120 of the cell housing 110, as shown in FIG. 4. In an embodiment, the electrode assembly 170 is immersed in the housing 110 and the electrolyte 126 is provided at a level (see FIGS. 4 and 7) within the chamber 120 that is above the tops of the electrodes 130, 140. The electrolyte 126 is a conductive medium, and may be an ionically conductive liquid electrolyte, in accordance with an embodiment. Each of the first and second electrodes 130 and 140 of the electrode assembly 170 are positioned to extend in vertical planes that are parallel with each other in the housing 110, as shown in the cross-sectional view of FIG. 4, for example. The at least one oxidant reduction electrode 150 (not shown in FIG. 4, but visible in FIG. 7; two electrodes 150 are shown in FIG. 8) is positioned to also extend in a vertical plane in the cell 100, such that its cell side (or face) is orthogonal or substantially orthogonal to the first and second sides of the electrodes 130, 140, as further described below.

This orthogonal arrangement of electrodes may reduce electrochemical impedance (a form of IR loss) through the electrolyte from the oxidant reducing electrode to the first and second electrodes which may result in a higher efficiency system, more uniform metal (zinc) distribution, and a reduced propensity for dendrite formation.

Spacers 180 may be configured between the individual first and second electrodes to prevent shorting between them, in accordance with an embodiment. For example, spacers 180 may be positioned between adjacent electrodes (e.g., between a first electrode and a second electrode, or between adjacent first electrodes, or between adjacent second electrodes), such as shown and described later with reference to FIGS. 10-13.

Alternate views of the exemplary electrochemical cell 100 are shown in FIGS. 5, 6 and 7. Specifically, FIG. 7 shows an alternate cross-sectional view of the electrode assembly 170 being submerged, at least partially, within an electrolyte 126. Although only one side of a first electrode 130 in the electrode assembly 170 is shown, it should be understood that the electrodes 130, 140 are positioned as shown in FIG. 4. Also shown is the position of the oxidant reduction electrode 150 (only a side edge thereof being shown in FIG. 7) in the chamber 120. The oxidant reduction electrode 150 is configured with an oxidant reduction module 160 having air chamber 162 (shown in FIG. 8). The oxidant reduction module 160 is also submerged, at least partially, within the electrolyte in the chamber 120 of housing 110. As noted above, the cell side or face of the oxidant reduction electrode 150 in module 160 is positioned orthogonally relative to the sides/faces of the electrodes 130, 140. Accordingly, the cell side of the electrode 150 faces the edges of the electrodes 130, 140 in the electrode assembly 170.

In an embodiment, the electrode assembly 170 is positioned apart from the oxidant reduction electrode 150 via a first offset-gap or space 118. Thus, there is a first offset-gap distance 118, shown in FIG. 8, between the oxidant reduction electrode 150 and the electrode assembly 170. The planes of the first and second electrodes are orthogonal to the plane of the oxidant reduction electrode 150. That is, ends of the first and second electrodes 130, 140 are spaced the distance 118 from the oxidant reduction electrode 150.

As shown in greater detail in FIG. 8, the electrode assembly 170 has a width from a first side 173 to a second side 174. As shown, a plurality of discrete spacers 180 may be configured between the electrodes 130, 140 of the electrode assembly or between the planes of the electrodes in the electrode assembly, in accordance with an embodiment. Accordingly, the electrolyte 126 may freely flow throughout the electrode assembly and through the spacers within the chamber 120/housing 110, to reduce electrochemical impedance.

In one embodiment, as shown in FIG. 8, there are two oxidant reduction electrodes 150, 150' on opposing ends 171, 172, of the electrode assembly 170. The oxidant reduction electrodes 150, 150' are configured within oxidant reduction electrode modules 160, having an air chamber 162. In an embodiment, the first electrode 130 is positioned apart from the oxidant reduction electrode 150 via a first offset gap or space 118. The second electrode 140 and the oxidant electrode 150 may be positioned apart by the same gap 118, or if the first and second electrodes are of different sizes their respective gaps with respect to the oxidant reduction electrode 150 may differ Similarly, on the other side the first electrode 130 is positioned apart from the oxidant reduction electrode 150' via a second offset gap or space 119, and the second electrode 140 is also positioned apart from the oxidant reduction electrode 150' by a gap which may be the same or of different size. Thus, there is a first offset gap distance 118 between the oxidant reduction electrode 150 and the first electrode 130 and a second offset gap distance 119 between the oxidant reduction electrode 150' and the first electrode 130, and likewise there are gaps of the same or different size between the reduction electrodes 150, 150' and the second electrode 140. The first and second offset distances may be the same or may be different. In one embodiment, one or both of the gaps 118, 119 between the electrodes 130, 140 and the air electrode(s) 150 are constant or essentially constant. In accordance with an embodiment, the first and second offset distances are different. In one embodiment, the first and second offset gap distances are different by at least 1 mm. In an embodiment, the distances 118, 119 are within a range of approximately 1 mm to approximately 15 mm (both inclusive). In an embodiment, the distances 118, 119 are within a range of approximately 3 mm to approximately 5 mm (both inclusive).

In accordance with an embodiment, the first and second electrodes 130, 140 are closer to the oxidant reduction electrode than to each other. That is, the spacing or distance between adjacent electrodes 130, 140 may be larger than the spacing or distance of the adjacent electrode 130, 140 relative to the oxidant reduction electrode 150.

An exemplary cell may have a plurality of first and second electrodes and a portion of the electrodes may be configured in an alternating arrangement with a first electrode configured between two second electrodes. This exemplary configuration provides access of the electrolyte to the surfaces of the electrodes and allows the oxidant reducing electrode to enable oxidation of zinc on the first electrode to balance the state of charge of the first and second electrodes, as described herein (which may be referred to as a first electrode balancing mode).

Figure 10:
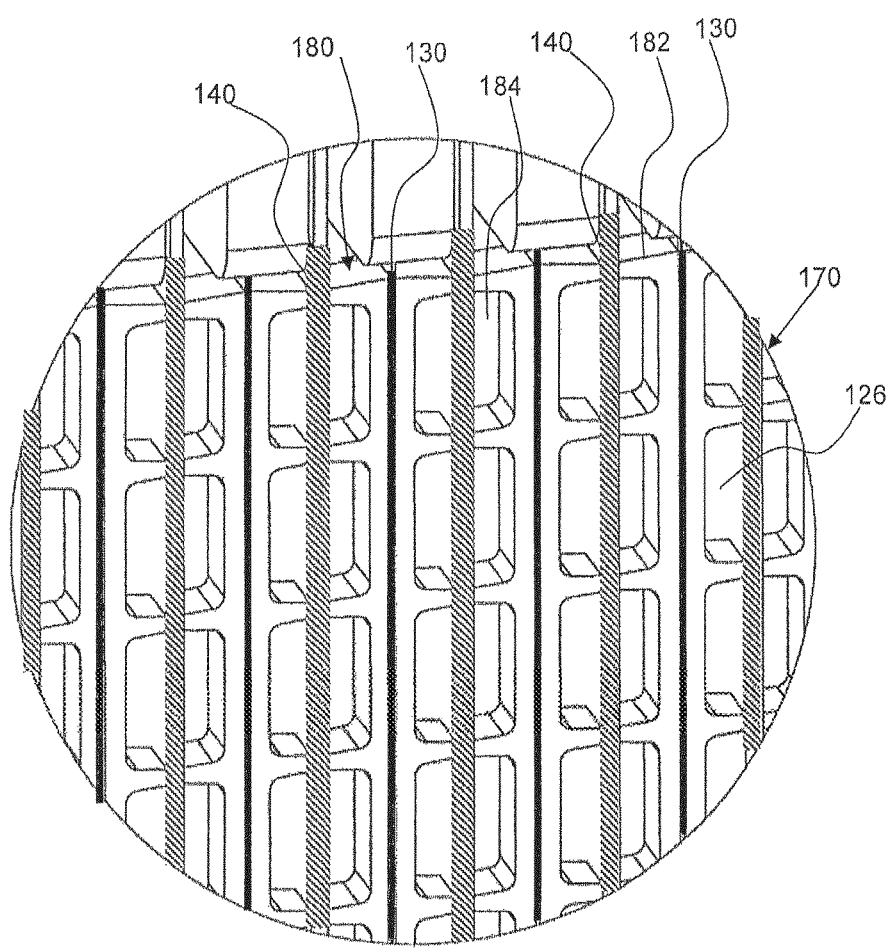
FIG. 10 shows an enlarged view of a portion of the electrode stack as shown in FIG. 9 in circle 10.

Referring now to FIGS. 9 and 10, an electrode assembly 170 comprises first electrodes 130 and second electrodes 140 that extend in planes that are substantially parallel. A plurality, or all, of the first electrodes 130 may be coupled to a terminal 103 and a plurality, or all, of the second electrodes 140 may be coupled with a terminal 104. As shown in FIG. 10, the first electrodes 130 and second electrodes 140 alternate and a spacer 180 is configured between the alternating electrodes. As previously noted, in an embodiment, the assembly of first 130 and second electrodes 140 may be held together by the bus bars 105 and 107 either by mechanical devices (e.g., compression with a threaded rod and threaded nuts compressing against spacers, or by welding a solid bus bar to each electrode). Alternatively or in addition, the assembly may be held together using a method to apply external compression to the assembly of electrodes and spacers, for example, using a mechanical mechanism, e.g., a strap around the assembly, using the sidewalls of the housing 110 (i.e., placement inside the chamber 120), or using compression plates and/or threaded rods extending through a portion of the assembly/electrodes/frame, with nuts and/or bolts at the ends of the rods for tightening and securing the electrodes relative to one another and together.

FIGS. 11-13 show in greater detail an example of spacers 180 that may be configured between adjacent electrodes 130 and 140. For reference and explanatory purposes only, the spacers 180 are shown as being connected to a frame 200 provided at a top of the first electrode 130. Connected to the frame 200 is a connector tab 109 that connects to a bus bar, i.e., bus bar 105 or 107, which in turn connects to its respective terminal. As shown in FIG. 11, the spacers 180 may extend from the frame 200, on either side of the electrode 130, and positioned such that they are relatively spaced along the electrode plane 137 (shown in FIG. 1) of the electrode 130. In an embodiment, the placement or spacing between spacers 180 along a width or electrode plane 137 of the electrode 130, is substantially equidistant. The spacer is configured to have gaps, holes, pores, or other means of preventing the spacer from blocking free ionic exchange in the electrolyte 126 from the oxidant reduction electrode 150 to the first and second electrodes 130 and 140. In one embodiment, each spacer 180 may include laterally extending portions 182, shown in FIG. 12, which form a number of openings 184 when provided in the assembly 180 adjacent other electrodes. Electrolyte can freely flow in-between the planes of the individual electrodes due to the openings 184 and vertical channels formed between the spacers 180.

Figure 14:
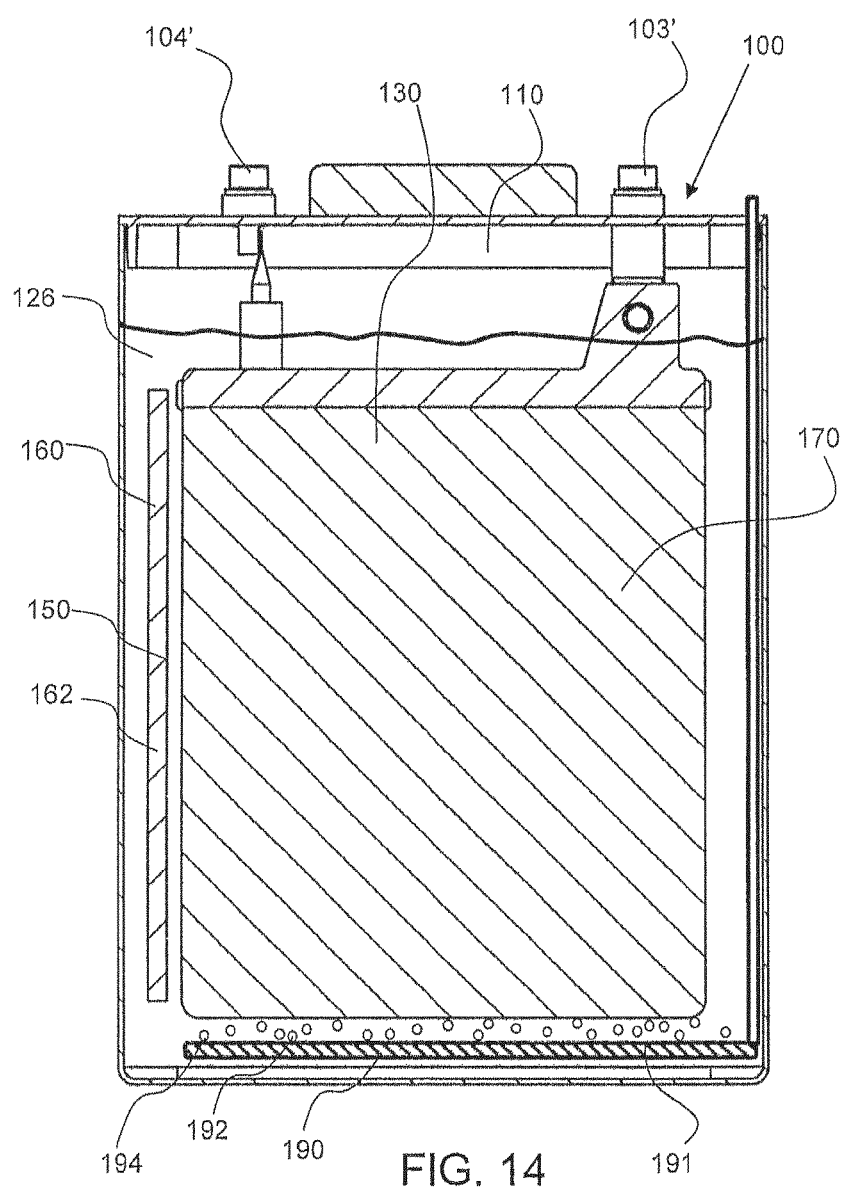
FIG. 14 shows an enlarged cross-sectional view an exemplary electrochemical cell comprising an oxidant reduction electrode, an electrode assembly such as shown in FIG. 9 with electrodes configured orthogonally to the oxidant reduction electrode, and a fourth, oxygen evolving electrode that is producing oxygen, in accordance with an embodiment of this disclosure.

An exemplary electrochemical cell may further comprise a fourth electrode that may be configured to evolve oxygen for the purpose of creating mixing or circulation of the electrolyte due to convection driven by rising oxygen bubbles in the liquid electrolyte between the electrodes. An exemplary fourth electrode may be configured below the other electrodes or at least below the first and second electrodes, wherein the oxygen bubbles created on the fourth electrode may bubble up through the first and second electrodes. As shown in FIG. 14, an exemplary electrochemical cell 100 comprises an oxidant reduction electrode 150, an electrode assembly 170 with electrodes configured orthogonally to the oxidant reduction electrode, and a fourth electrode 190, or "oxygen evolving electrode", that produces oxygen 192 via bubbles 194, which may be a portion of or the same structure as a catch tray 191.

The fourth electrode 190 is immersed in the electrolyte 126. The fourth electrode 190 may include a body having a first side and a second side, which extends in a corresponding plane, each plane extending from a first side edge to a second side edge and from a top edge to a bottom edge relative to the electrode. The fourth electrode 190 may be positioned in a horizontal plane, e.g., on, at, or near a bottom of the cell housing 120 of the chamber 110, and below the vertically positioned electrodes 130, 140. Accordingly, the fourth electrode 190 has a side that faces (in an upward direction) the edges of the electrodes 130, 140 in the electrode assembly 170. Oxygen 192 in bubbles 194 (exaggerated for illustrative purposes) that are produced by the oxygen evolving electrode 190 rises up in the electrolyte 126 and in-between the planes of the electrodes 130, 140 in the electrode assembly 170 to circulate the electrolyte and prevent stratification. More specifically, oxygen bubbles are created on the fourth electrode or oxygen evolving electrode 190 by oxidation of hydroxide ions to oxygen gas, countered by the reduction of oxygen gas from air at the air cathode or oxidant reducing electrode 150 (which reduced oxygen may form, e.g., hydroxide ions in the electrolyte solution). That is, the electrodes 150 and 190 are electrically coupled together with an anodic potential at the electrode 190 and a cathodic potential at the electrode 150. Generally, a controller or circuit is used to control the modes and operation of the cell, as described in greater detail below. In the case of utilizing the oxygen evolving electrode 190, for example, the controller is configured to apply an external voltage (potential) or current source between the oxidant reduction electrode 150 and the fourth electrode 190 to provide a driving force for oxygen reduction on the oxidant reduction electrode 150 and oxygen evolution on the fourth electrode 190.

A catch tray 191 functions to oxidize metal fuel, e.g., metallic zinc, that has fallen downwardly from the electrodes 130. For example, zinc dendrites or particles may break off and fall downwardly to fall onto the catch tray. The oxidiation reaction dissolves the zinc or other metal, forming an oxide by-product in the electrolyte solution and making it available for re-deposition during charging. The catch tray 191 may be a catalyst that performs this reaction entirely locally with no application of current, oxidizing zinc to an oxide species thereof and reducing hydrogen ions locally to generate hydrogen gas (in relatively small amounts). Alternatively, the catch tray 191 could have an anodic potential applied to it, such as the potential applied to the electrodes 130. Reference may be made to U.S. Pat. No. 9,269,995 for details on that function, the entirety of which is incorporated herein by reference. Preferably, the same electrode can be used as both the oxygen evolving electrode 190 and the catch tray 191. Alternatively, the catch tray 191 and oxygen evolving electrode 190 could be separate electrodes, and in that case the catch tray 191 would preferably be positioned above the oxygen evolving electrode 190 to intercept falling metal particles before reaching the oxygen evolving electrode 190. The catch tray 191 is preferably porous to permit the upward passage of oxygen bubbles from the evolving electrode 190 to generate the convective flow discussed above.

Figure 15:
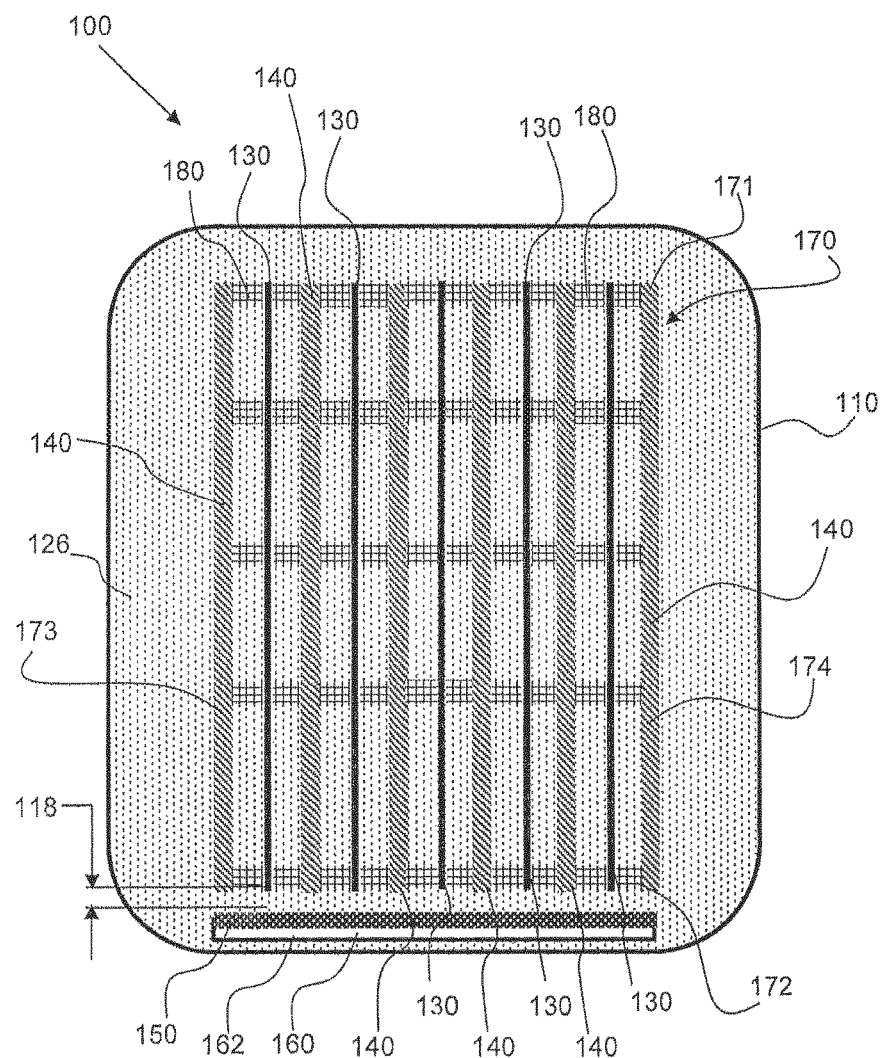
FIGS. 15-16 show cross-sectional views, similar to the cross section take along line 8-8 in FIG. 3, of alternate embodiments of electrochemical cells having electrode assemblies and oxidant reduction (air) electrode(s) arranged in a housing, in accordance with embodiments herein.
Figure 16:
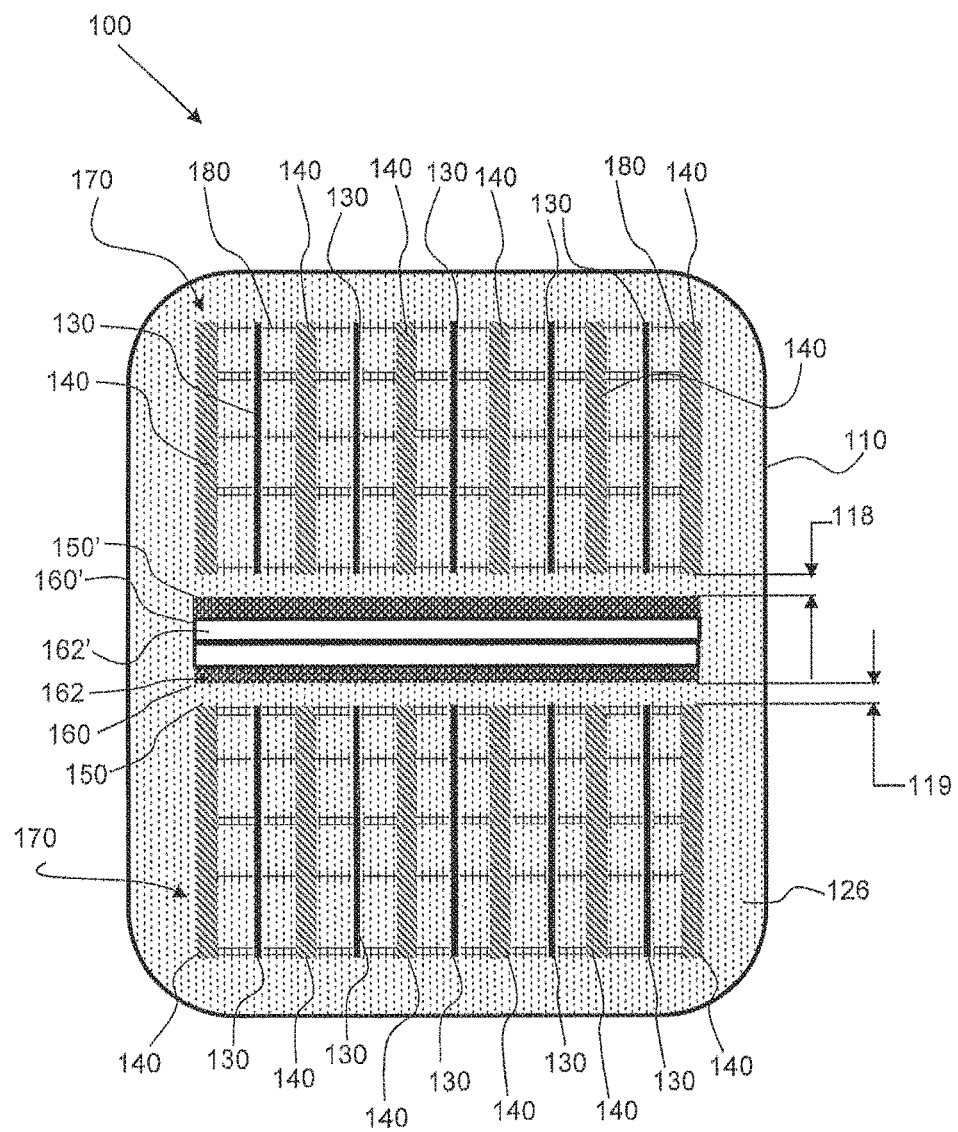

FIGS. 15-16 show additional embodiments of a cell 100 having an electrode assembly 170 positioned within a cell housing 110 along with an oxidant reduction electrode 150. The views of FIGS. 15-16 are cross sectional views similar to the cross section as taken along line 8-8 in FIG. 3, but with different arrangements provided within the housing 110. In essence, each is a top or overhead view, looking down into the cell housing 110. For purposes of clarity and brevity, like elements and components throughout the Figures are labeled with same designations and numbering as discussed with reference to FIGS. 1-14. Thus, although not discussed entirely in detail herein, one of ordinary skill in the art should understand that various features associated with the cells 100 of FIGS. 15-16 are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

FIG. 15 shows an embodiment of an electrochemical cell 100 having a cell housing 110 with electrolyte 126 therein, as well as an electrode assembly 170 positioned orthogonally relative to a single oxidant reduction electrode 150. As previously described, the electrode assembly 170 is positioned apart from the oxidant reduction electrode 150 via a first offset gap, space, or distance 118. The planes of the first and second electrodes are orthogonal to the plane of the oxidant reduction electrode 150. That is, ends of the first and second electrodes 130, 140 are spaced the distance 118 from the oxidant reduction electrode 150.

FIG. 16 shows another embodiment of an electrochemical cell 100 having a cell housing 110 with electrolyte 126 therein. In this case, two electrode assemblies are 170 positioned orthogonally relative to at least one oxidant reduction electrode 150. Specifically, FIG. 16 shows two oxidant reduction electrodes 150, 150' provided in the middle of the housing 110 and in between the assemblies 170; however, a single oxidant reduction electrode may also be used. Each assembly 170 may be positioned relative to the oxidant reduction electrode(s) 150 by a gap, space, or distance 118, 119, for example. The planes of the first and second electrodes 130, 140 in each assembly 170 are orthogonal to the plane of the oxidant reduction electrode(s) 150.

Although not shown in the cells of FIGS. 15-16, an oxygen evolving electrode 190, such as described with reference to FIG. 14, may also be provided in each of the housings 110.

Figure 17:
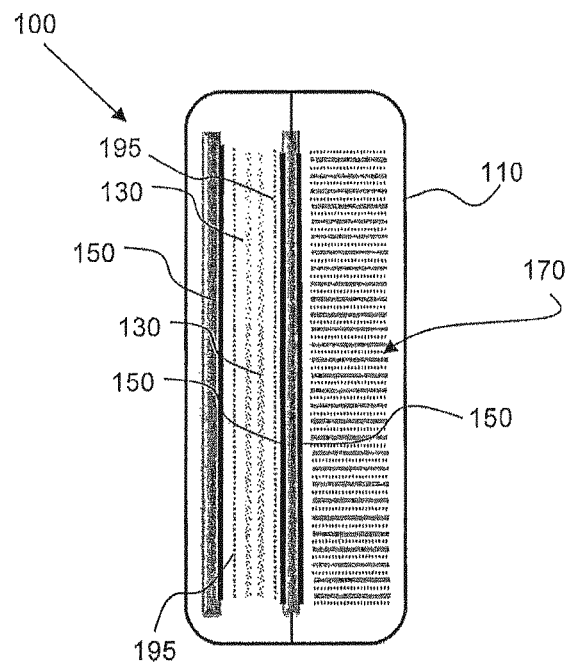
FIGS. 17 and 18 show examples of hybrid electrochemical cells including at least one electrode assembly arranged with an oxidant reduction electrode that is orthogonal thereto, and a number of additional electrodes, in accordance with embodiments of this disclosure.
Figure 18:
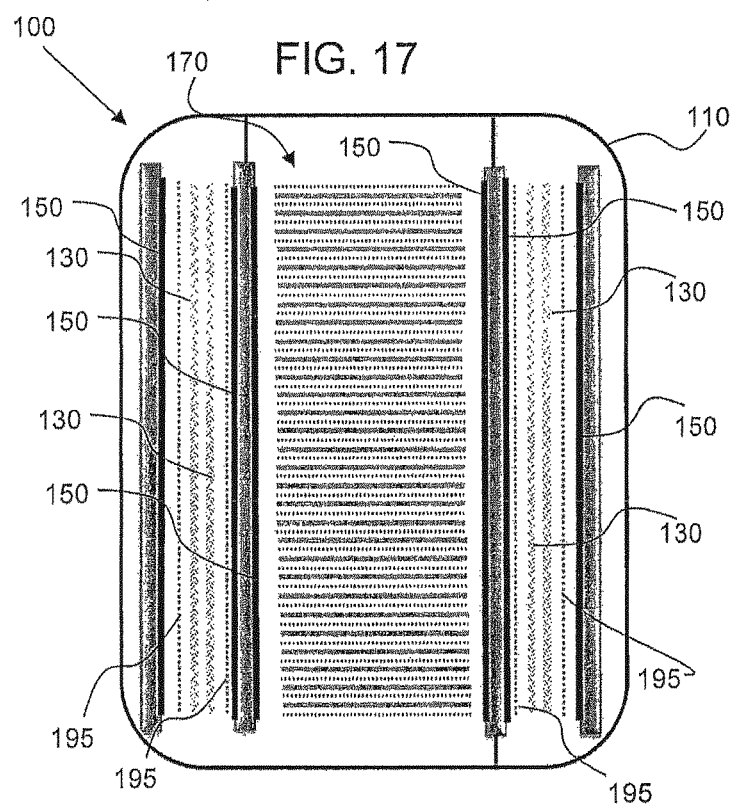

FIGS. 17-18 each show examples of hybrid electrochemical cells, in accordance with embodiments herein. The views of FIGS. 17-18 are cross sectional views similar to the cross section as taken along line 8-8 in FIG. 3, but with different arrangements provided within the housing 110. In essence, each is a top or overhead view, looking down into the cell housing 110. Each of the hybrid cells 100 shown in FIGS. 17-18 include housings 100 that contain electrolyte therein. Further, a hybrid electrochemical cell like that of FIGS. 17-18 is a cell that contains both a metal-air battery comprising the first electrode 130 (e.g., a zinc electrode) and the air electrode 150 and a battery including the first and second battery electrodes 130, 140 (e.g., Ni and Zn electrodes). Accordingly, a hybrid electrochemical cell may provide power to a load either via using metal-air battery electrodes or via Ni—Zn battery electrodes, as discussed previously herein. As understood by the Figures and corresponding description below, the air cathode(s) 150 in the cell may provide power to the load, whereas, in the substantially orthogonal configurations detailed above, the air cathode 150 is used only to manage the state of charge of the first and second electrodes 130, 140 and to allow the fourth electrode 190 to generate oxygen for stirring.

FIG. 17 shows a hybrid electrochemical cell 100 having a housing 110 with an electrode assembly 170 on one side (here, the right side) of the housing and positioned orthogonally with respect to an oxidant reduction electrode 150. The planes (137) of the first and second electrodes (130, 140) in the assembly 170 are orthogonal or essentially orthogonal to the plane (157) of the oxidant reduction electrode 150. On the other side of the cell 100 (here, the left side) a number of first or fuel electrodes 130 and charging electrodes 195 are provided, along with another oxidant reduction electrode 150. The charging electrodes 195 are used to charge the electrodes 130, with an external power source applying current with an anodic potential at the charging electrode 195 to oxidize oxygen in the electrolyte solution and a cathodic potential at the electrodes 130 to reduce the active metal (e.g., zinc). Thus, the charging electrodes 195 are basically oxygen evolution electrodes as discussed previously herein.

In the illustrated embodiment, the charging electrodes 195 are provided outside of the fuel electrodes 130, although other locations are also an option (such as one charging electrode 195 separating a set of fuel electrodes 130, or other arrangements). Also, three oxidant reduction electrodes 150 are provided in the cell. For example, as shown, the electrodes 130, 195 may be flanked by oxidant reduction electrodes 150 on either side. A wall may be provided to separate the housing portions for the electrode assembly 170 and the additional first electrodes 130 and their associated charging and air electrodes 195, 150. The additional electrodes 130, 195 may be positioned such that their planes are positioned parallel to each other and to the oxidant reduction electrodes 150. Electrolyte may be designed to flow freely through the housing 110, and, in some cases, into both sides, portions, or sections of the cell 100. In the design in FIG. 17, the two adjacent air electrodes in the middle of the cell (where the wall is located) may bound the opposite sides of a common air chamber, thus enabling oxygen or other gaseous oxidant to be absorbed via the faces thereof. The other air electrode 150 to the left side of the Figure may also face an air chamber or form part of the external face of the cell housing, as previously described.

FIG. 18 illustrates another hybrid electrochemical cell 100 in accordance with an embodiment. In the illustrated embodiment, five oxidant reduction electrodes 150 are provided in the cell. FIG. 18 includes a similar configuration as described above with reference to FIG. 17 as well as a third portion in its housing 110. That is, a second set of first or fuel electrodes 130 and charging electrodes 195 are provided, along with oxidant reduction electrodes 150, on an opposite side of the electrode assembly 170 (shown here, to the right of the assembly 170). Accordingly, the electrode assembly 170 is flanked by oxidant reduction electrodes 150 on either side, as well as electrodes 130, 195. Walls may be provided to separate the housing portions for the electrode assembly 170 and the additional electrodes 130, 150 and 195. The additional electrodes 130, 195 on the right side may be positioned such that their planes are also positioned parallel to the oxidant reduction electrodes 150. Again, the air electrodes 150 to the right of the assembly 170 where the internal wall is located may share a common air chamber, as mentioned above with regard to FIG. 17 and the air electrode 150 on the opposite side of the added fuel and charging electrodes 130, 195 may have its own air chamber or form a part of the external face of the housing 110. Electrolyte may be designed to flow freely through the housing 110, and, in some cases, into all sides, portions, or sections of the cell 100.

The designs of FIGS. 17 and 18 provide a design that combines in the same housing a first battery, such as a Ni—Zn battery provided by the electrodes 130, 140 in assembly 170, and a second battery or batteries, such as a Zn-air battery provided by the electrodes 130, 150. In each non-limiting design of FIGS. 17 and 18, which are top views, a catch tray 191 may be positioned beneath of sets of electrodes to capture and oxidize metal particles/dendrites, as discussed above. An oxygen evolving electrode 190, separate from or provided by the same structure as the catch tray 191, may also be provided beneath the sets of electrodes. An oxygen evolving electrode 190 is less needed in these designs because electrodes 195 also have an oxygen evolving functionality, although it may be desired based on the internal configuration of the cell and the ability to circulate oxide by-products in the electrolyte solution. An option may be to include an oxygen evolving electrode 190 only beneath the assembly 170, and allow the other battery cells to use the charging electrodes 195 to drive oxygen bubble flow in their own housing portions.

Figure 19:
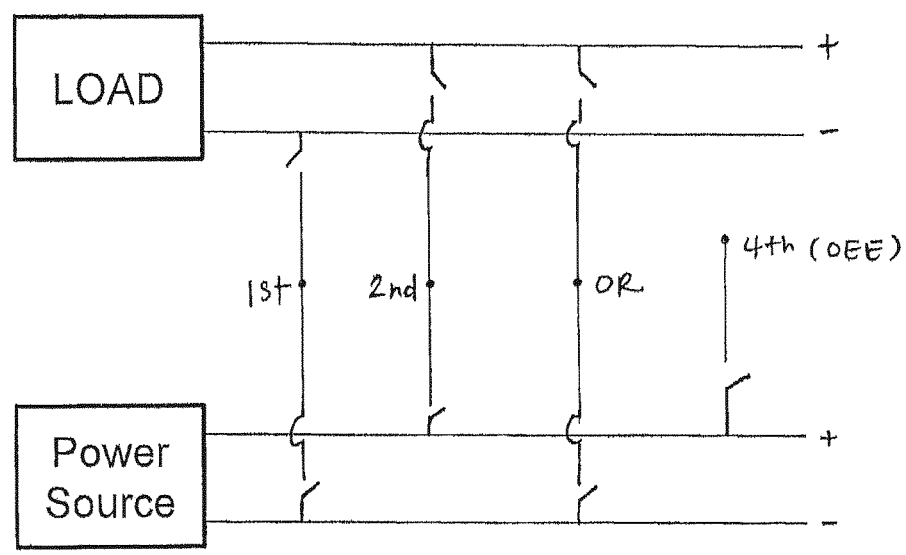
FIG. 19 is an exemplary circuit diagram associated with a controller of an electrochemical cell of the herein disclosed embodiments, in accordance with an embodiment.

FIG. 19 is an exemplary circuit diagram associated with a controller of an electrochemical cell in accordance with an embodiment. As represented, the first electrode 130, second electrode 140, oxidant reduction electrode 150, and fourth/oxygen evolving electrode 190 may be connected and disconnected from a load and a power source in order to implement a number of charge and discharge modes on the electrochemical cell 100. A controller may be configured to switch the cell from one mode to another, as required for charging and discharging and for balancing the zinc capacity to nickel capacity and for mixing the electrolyte. A controller may switch between electrodes as required or may connect the cell to a load to provide power. A controller may also run diagnosis of the cell, wherein the controller may measure the potential between electrodes in the cell, such as nickel electrode and oxidant reduction electrode, or the zinc electrode and nickel electrode to determine the state of charge of the zinc or nickel electrodes, for example. This may take about 1 to 10 seconds to measure, for example.

It can be envisioned that the connections of the controller of FIG. 19 can be extended to manage the additional electrodes in the embodiments of FIGS. 17 and 18.

FIG. 20 shows a chart of different modes that may be implemented in the electrochemical cell, in accordance with an embodiment. It should be noted that in practice the negative and positive leads to the electrodes are via terminals, for example terminals 103 and 104 and bus bars or other connections is multiple electrodes are used together. There will be additional switches either in the cell or elsewhere in the system governing whether the cell is connected to a driven load or a power source. The "−" in the chart of FIG. 20 refers to a terminal or connection point that is negative during standard or primary discharge operation and the "+" refers to a terminal or connection point that is positive during normal discharge operation. Thus, the zinc electrode would have an anodic (negative) potential during discharge and a cathodic (positive) potential during recharge, even though it is connected to the same negative terminal. Thus, the "−" used for the anode in FIG. 20 for both "Primary Discharge" and "Primary Charge" denotes that anode is connected to the negative connection/terminal, which in turn is connected to the load during discharge and the power supply during charge. The "−" does not denote the anodic/cathodic nature of the potential, and that varies depending on the reactions taken place and the flow of the current. Generally, the "Power Supply" applies a potential of opposite polarity to the "+/−" referenced in the chart.

As described previously, the Faradaic charge-discharge efficiency of zinc is 95 to 98% but only 90 to 95% for nickel, may result in excess zinc, or residual zinc, remaining in a metallic state in the anode as the battery approaches a fully discharged state, i.e., when the nickel is fully discharged. In the case of an electrochemical cell 100 having a zinc electrode 130 and a nickel-based electrode 140, the oxidant reducing electrode 150 may be used to discharge this above-noted excess zinc in the anode by creating, in essence, a zinc-air battery and discharging/oxidizing more metallic zinc from the anode versus oxygen whereby the oxidant reducing electrode 150 functions as an air cathode (also referred to a first electrode balancing mode, as the balancing is done by discharge of the first electrode). This can be done after each cycle or after a series of partial cycles. The half-cell reaction occurring at the oxidant electrode, or air cathode, during discharge is oxygen reduction and may be expressed as:

$$\tfrac{1}{2}O_2 + H_2O + 2e^- \rightarrow 2OH^-$$

And the corresponding oxidation half-cell reaction occurring at the zinc or first battery electrode may be expressed as:

$$Zn + 4OH^- \rightarrow Zn(OH)_4^{2-} + 2e^-$$

The oxidant reduction electrode 150 or air cathode can be considered an "infinite" capacity cathode, as oxygen may be supplied continually from ambient air. In practice, the balancing operation is performed by connecting the zinc electrode(s) and the air electrode(s) to a load, which as discussed below may be a resistor or other circuit rather than a functional, driven load (which may be called a sink or drain load, since its purpose is to provide a "sink" for current that represents the oxidation of zinc). As an example, the zinc electrodes 130 may be connected to the negative battery terminal and switches in the cell may be operated to connect the air electrode(s) 150 to the positive terminal, which in turn are connected to the load (which may be a functional load or sink load). Where the load is a sink load, the sink load may optionally reside in the battery and thus one or more internal switches may disconnect the zinc electrode(s) from the negative terminal and connect the zinc electrode(s) to the bleed load. In embodiments where the air electrode(s) is/are only used for a balancing functionality, they may remain continually connected to the sink load. In embodiments where the air electrode(s) also require connection to a terminal (such as the oxygen evolution discussed below), one or more internal switches may be used to switch the air electrodes(s) between connection to the needed terminal (e.g., the negative terminal to receive the cathodic potential of a power supply). In hybrid embodiments, one or more internal switches may be used to switch the connection of the air electrode(s) between the positive terminal for discharge to a functional load and the sink load for performing a bleed function. Or if one or more air electrodes are dedicated to only the bleed function, then that/those electrode(s) may remain continually connected to the sink load. Any possible arrangement may be used to effectuate the modes of operation for which the cell is designed, and these examples are not limiting.

The excess or residual zinc, with respect to the amount of nickel oxy-hydroxide, can be managed in a number of ways. The excess zinc may be discharged using the oxidant reduction/air electrode near the bottom of a discharge cycle, when the nickel is depleted or near depletion. This clean up at the bottom of the discharge cycle may take some time, however, and while in this "bottom balancing mode", the cell cannot be switched over to provide power to a load (as the nickel is depleted or near depletion). Therefore, this may not be a preferred balancing mode in some systems, especially those with a single or few number of cells that might have frequent load requirements. However, it is an option within the invention.

Another balancing mode is a "top balancing mode", in which the zinc is discharged using the oxidant reducing electrode after a charging cycle, or at the top of charge. A balancing percentage of zinc may be discharged to balance the state of charge of Zn and Ni. Note that by balancing at the top of charge, the Zn and Ni should later be fully discharged with no excess or little excess zinc at the bottom of the discharge cycle. That is, the nickel and zinc should be both at depleted levels or close at the end of discharge. An advantage of this top balancing mode is that the cell is ready for discharge at any time if needed. This top balancing mode may leave more uncertainty about the ratio of zinc to nickel whereas in the bottom balancing mode there is more certainty that the state of charge for both nickel and zinc are zero after the balancing.

Another balancing mode is the nickel balancing mode, wherein the nickel electrode is charged versus the oxidant or air electrode, to oxidize more nickel hydroxide to nickel oxy-hydroxide versus oxygen reduction before moving to a standard recharge mode. (If a reversible metal species other than nickel is used, this may be referred to as a second electrode or reversible metal balancing mode since that electrode is being charged to affect the balancing—nickel balancing is used herein for convenience in reference to the embodiment using a reversible nickel species). In this mode, an external power supply is used, in which the nickel electrode has an anodic potential applied to it and the air electrode(s) have a cathodic potential applied to it, thus oxidizing the nickel species to nickel oxyhydroxide and reducing oxygen. Thus, the power supply connected to the terminals may have a cathodic potential at the negative terminal, to which the air electrode is connected, and an anodic potential at the positive terminal, to which the nickel electrode is connected. As mentioned, one or more switches may be used to switch the nickel electrode from its normal connection to the positive terminal to the negative terminal, and to switch the air electrode to connection to the negative terminal. A trade-off of this balancing mode is that it may have low Faradaic Efficiency due to parasitic oxygen evolution at the nickel electrode. However, it is an option within the invention. This nickel balancing mode may be best at or near the bottom of a discharge cycle, when the nickel oxy-hydroxide is fully discharged and the charge potential is closer to 1.8V versus zinc. This will reduce oxygen evolution and the resulting low Faradaic efficiency of nickel charging. This mode may be included in a cell with with or without a balancing of the other (e.g., zinc) electrode.

Another balancing mode is the bleed balancing mode wherein during charging mode some current from the anode is bled or coupled to the oxidant reducing electrode. In this approach, a sink load is used. The first/zinc and second/nickel electrodes 130, 140 (referring to the non-limiting materials of the example embodiment) are connected to the negative and positive terminals, respectively, as is the case for primary or standard recharging. However, because it is understood that the zinc has a better Faradaic efficiency, the zinc electrode and the air electrode are also connected to a sink load to bleed off some of the current delivered to the zinc electrode (which is preferably controlled to match the difference in Faradaic efficiency). Switches may be used to effect such connections for the zinc and air electrodes. The result of such an operation is that the zinc and nickel electrodes should end up charged essentially evenly. It may be more difficult to control the amount of current bled into the air cathode and may result in non-uniformities of deposition of the zinc. However, this approach may avoid the need for separate re-balancing, or at the least reduce the frequency at which it is done.

It is noted that, the chart of FIG. 20, generally references a load with regards to some of its modes. One of ordinary skill in the art understands that, in practice, the load used in the bleed balancing mode and the above described top/bottom balancing mode would not be the same load used in the primary discharge mode, and, most likely it would be a small ancillary load, like a resistor, to bleed off charge, i.e., the sink load mentioned above. Alternatively, the power generated during bleed balancing can be used as a power source.

In a recharge mode, a power source is coupled to the first electrode or zinc electrode and the second electrode comprising the reversible metal for applying a potential difference therebetween to cause reduction of a reducible species of the metal fuel on the first electrode and oxidizing the oxidizable species of the reversible metal in the second electrode, if present, to the reducible species thereof.

Each of the above described modes may be affected by the IR drop (voltage drop) through the electrolyte due to the orthogonal orientation of the nickel electrode and air cathode and can lead to non-uniform nickel oxidation across the width of the nickel electrode. However, the positioning of the oxidant reduction electrode(s) on the side of the cell and relatively perpendicular to the first and second (metal) electrodes, allows for more consistent ionic resistance across all the metal electrodes, as compared to oxidant reduction electrode(s) at the outer ends and positioned parallel to the first and second (metal) electrodes. In using an electrode stack or assembly such as assembly 170, there may be a range of ionic resistance between the air electrode(s) and the metal electrodes, because the metal electrodes in the middle are much further away from the electrodes at the end (if they were all parallel); i.e., the ionic resistance would be much higher for those in the middle compared with those at the ends closest to the air electrodes. Thus, positioning the air/oxidant reduction electrode(s) so that they are perpendicular to the electrodes allows for on average less IR drop across the stack/assembly than if the air/oxidant reduction electrode(s) were placed parallel to the first/second electrodes at the end of the assembly.

In an exemplary discharge state, the first or zinc electrode and the second or nickel electrode, comprising the reversible metal, are coupled to the load such that oxidation of the metal fuel at the first electrode and reduction of the reducible species of the reversible metal, if present, to the oxidizable species thereof generates a potential difference for outputting current.

An exemplary controller may periodically switch to the mixing mode to produce bubbles from the fourth electrode 190 that mixes the electrolyte to prevent stratification. This may be done during charging or before charging. It may be preferred to do this before charging (e.g., for about 10 to 30 seconds) to reduce any ionic gradients or concentration gradients of zinc in the electrolyte formed by gravitational stratification. This may result in more efficient battery operation and more uniform deposition of zinc. Stratification takes hours and therefore running the system in mixing mode every hour or every half hour or more may prevent stratification.

Figure 21:
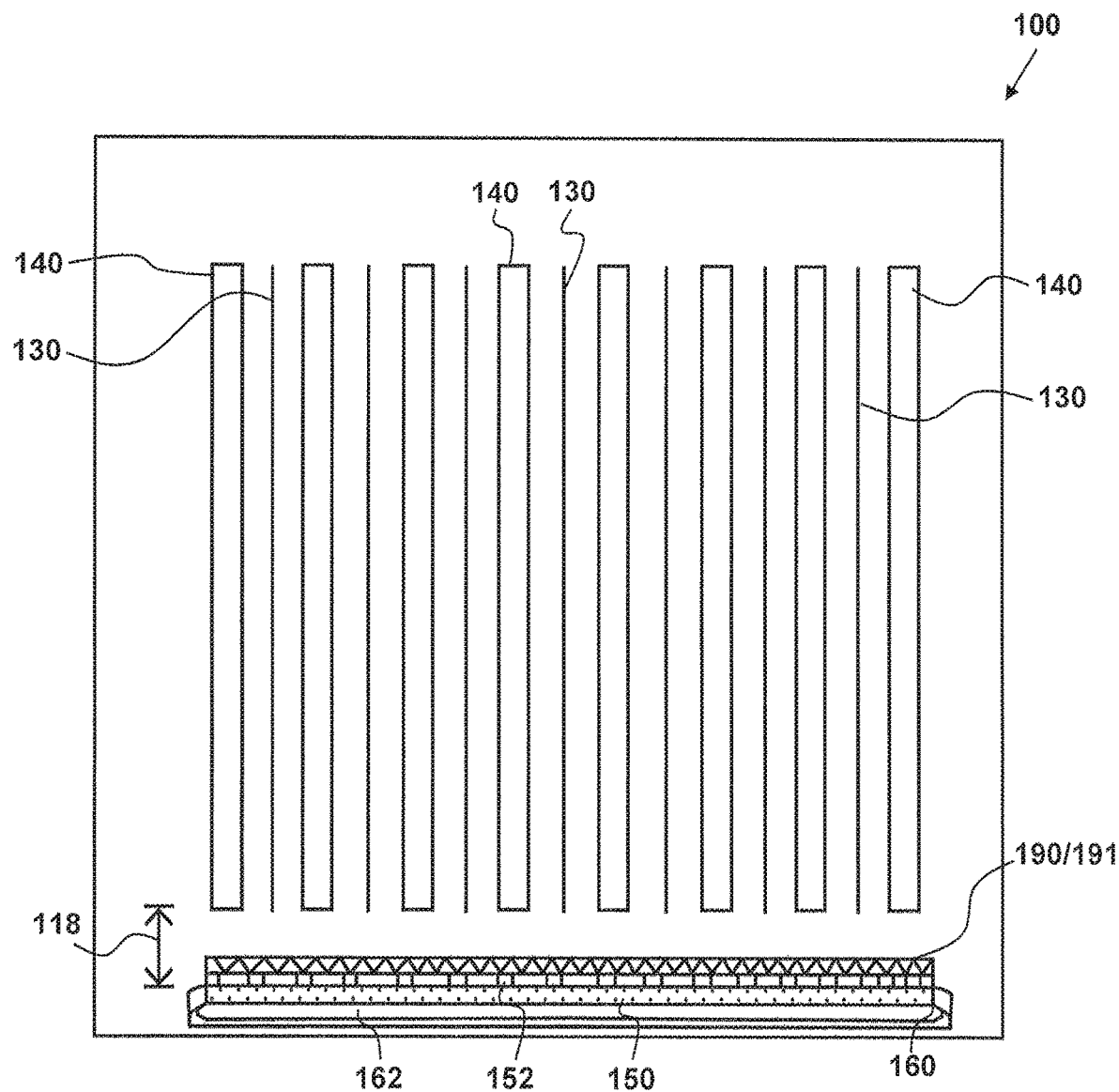
FIG. 21 illustrates a further alternative embodiment with the oxidant reduction electrode on the bottom of the cell.

FIG. 21 illustrates a further alternative embodiment. As with the prior Figures, common reference numerals denote common structures. FIG. 21 is a schematic representation of a cross-section of a cell taken perpendicularly to the electrodes 130, 140, which in the illustrated example may be a zinc electrode 130 and a reversible nickel electrode 140, as discussed above. The scale and size of the illustrated parts is not intended to be limiting, and the schematic nature of FIG. 21 is intended to convey the basic concept in general. The electrodes 130, 140 are arranged in parallel alternating relationship in a vertical orientation (i.e., up and down), as in the prior embodiments. Similarly, also as discussed above, the electrode serving as the oxygen evolving electrode 190 and/or catch tray 191, if included, is also located below and arranged perpendicularly to the electrodes 130, 140.

However, the oxygen reduction electrode 150, such as an air electrode, is located below and arranged perpendicularly to the electrodes 130, 140, instead of being arranged in a perpendicular orientation on a lateral side of the electrodes 130, 140. Like the previously discussed designs, the air electrode 150 faces a supply of air for absorbing and reducing oxygen or another gaseous oxidant, which supply may be from an air chamber 162 as shown, or the electrode 150 may constitute part of an external face of the housing. In the illustrated design, the air electrode 150 may be combined into a module 160 providing the air chamber 162, as is known and was previously mentioned. This approach, however, is exemplary and not limiting.

The operation of the cell is generally the same as the prior embodiments, and any combination of the modes discussed above may be used in the cell of FIG. 21. The cell 100 may be a hybrid cell where the zinc electrode 130 can be coupled to the air electrode 150 for power generation for delivery to a functional load, in addition to being able to be coupled to the nickel electrode 140, as discussed above. Likewise, the cell 100 may not be of the hybrid type, and the air electrode 150 may be used for other purposes, such as state of charge management (balancing) and/or coupling to the oxygen evolution electrode 190 to generate oxygen for stirring, also as discussed above. The modes of operation are not intended to be limiting, and the configuration of FIG. 21 may be used for any of the purposes or modes discussed above, or otherwise available.

The configuration of FIG. 21 with the air electrode 150 on the bottom has a number of advantages. One non-limiting advantage is that the air electrode 150 on the bottom provides for more design freedom in the horizontal lengths of the electrodes 130, 140. Specifically, in the design of the prior embodiments where the electrode 150 is arranged on the side, it is more challenging to increase the geometric area (i.e., the area defined by outer boundaries, such as length by width for rectangular electrodes, and not accounting for surface area attributable to porosity, surface shaping, or the like). As height is increased, that exaggerates issues with stratification of the oxide by-product (e.g., zinc oxide) and can lead to more uneven deposits in the vertical direction. As horizontal length is increased, then regions of the electrodes 130, 140 become further away from the air electrode 150 at the side, which increases IR losses for reactions between the air electrode 150 and the electrodes 130, 140 at those regions. For example, in the embodiment where an air electrode 150 is arranged on each side, as the horizontal length is increased, the IR loss between the central area of the zinc electrode 130 and the air electrodes 150 during zinc balancing operations is increased due to the increased distance. The same may apply to nickel or bleed balancing operations also. However, with the air electrode 150 arranged underneath the electrodes 130, 140, the horizontal length of the electrodes 130, 140 can be extended along with the length of the air electrode 150 in that same direction (i.e., perpendicular to the view in FIG. 21) likewise being extended. This allows for increase of the overall geometric area of the electrodes 130, 140 without increasing IR losses due to increased distance to the air electrode 150 and without increased stratification arising from increased height.

Additionally, because zinc (or any other metal) as an oxide in solution tends to stratify (drop down) because of its weight, there tends to be an increase in the mass of zinc deposited at the lower regions of the electrodes 130 during charging. By having the air electrode 150 at the bottom, this put the air electrode 150 closer to those lower regions, which in turn increases the efficiency of the electrochemical coupling between the air electrode 150 and that increased mass of zinc in the lower regions.

The inclusion of the oxygen evolution electrode 190 and/or the catch tray 191 (which in the illustrated design is a single porous electrode, such as a screen or grid, denoted 190/191) also offers additional non-limiting advantages. For example, when air electrode modules 160 are positioned to the lateral sides of the electrodes 130, 140 and oriented vertically, the spaces between the modules 160 and the housing walls can act as dead zones where the metal-oxide by-product (e.g., ZnO) can reside without direct access to the zinc electrodes 130 for re-plating. Because the air electrode 150 (and any modules 160 associated therewith) is under the electrodes 130, 140, rather than being located on the sides, that eliminates the creation of vertical dead zones between the modules 160 and housing walls that can occur in designs with vertically oriented air electrodes/modules. The oxygen evolution electrode 190 situated underneath the electrodes 130, 140 in FIG. 21, this will drive flow upwardly by oxygen evolution, without concern about the zinc oxide or other by-product being entrapped behind vertical modules.

Similarly, because the oxygen evolution electrode 190 and the air electrode 150 are both beneath the electrodes 130, 140, they are in very close proximity to one another, which minimizes IR loss due to inter-electrode distances in a mode where the two are coupled together, i.e., a stirring mode where the air electrode 150 is used to reduced oxygen and the oxygen evolving electrode is used to evolve oxygen for driving the convective flow within the electrolyte solution in the cell.

In the illustrated, non-limiting embodiment of FIG. 21, the air electrode 150 and (if used) the module 160 including the same and defining the air chamber 162 are located beneath and perpendicular to the electrodes 130, 140. The electrode 190/191 serving as the oxygen evolution electrode 190 and the catch tray 191 is also located beneath and perpendicular to the electrodes 130, 140, above the air electrode 150. A non-conductive porous spacer 152 is positioned between the air electrode 150 and electrode 190/191 to electrically isolate them from one another. The spacer 152 is porous, such as a grid or screen. That allows contact between the air electrode 150 and the electrolyte solution for oxygen reduction reactions. The electrode 190/191 is also preferably porous, such as a screen or grid. The pores of the electrode 190/191 are preferably small enough to capture any falling unoxidized zinc (whereby it can be oxidized by the catch tray functionality discussed above) and preventing it from landing on the air electrode 150. The pore sizes of the electrode 190/191 and the spacer 152 may be of any size, and may be selected to balance competing factors such as the metal used, anticipated particle size of falling unoxidized metal, potential IR loss due pore sizing, and the like to ensure optimal performance.

The embodiment of FIG. 21 may also be supplemented by adding an air electrode 150 above the electrodes 130, 140 in a perpendicular orientation, much like the embodiments discussed earlier with air electrodes on opposing lateral sides. The upper air electrode 150 would not have any need for a catch tray. Likewise, it may form part of the upper face of the housing, or it may be included in a module 160. Furthermore, in some embodiments an air electrode 150 or a pair thereof oriented vertically and arranged perpendicularly to the electrodes 130, 140 (as in the previously discussed embodiments) in addition to the lower air electrode 150 (and upper air electrode 150 if used).

The foregoing embodiments are not intended to be limiting and other arrangements can be used. For example, it is also possible to have an air electrode 150 (and a module 160 including it and an air chamber 162 if used) positioned above the electrodes 130, 140 perpendicularly thereto without any other air electrode 150 beneath the electrodes 130, 140. This is less desirable, but would still achieve the advantage of allowing the electrodes 130, 140 to be lengthened in the horizontal direction. One situation where this may be useful would be to permit use of an air electrode 150 that has high electrochemical performance characteristics, but poor impermeability to the liquid electrolyte solution, without concern of a leakage risk at the bottom of the cell volume.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An electrochemical cell comprising:
   a cell housing for retaining a volume of an electrolyte therein, the cell housing having a top and a bottom;
   at least one first battery electrode provided in the cell housing;
   at least one second battery electrode provided in the cell housing; and
   an oxidant reduction electrode provided in the cell housing with an interior surface contacting the electrolyte and an exterior surface for exposure to oxygen;
   wherein said oxidant reduction electrode is oriented essentially orthogonally to said first and second battery electrodes, and
   wherein the oxidant reduction electrode is provided below the at least one first battery electrode and the at least one second battery electrode and adjacent to the bottom of the cell housing,
   wherein the oxidant reduction electrode is configured in an oxidant reduction electrode module contained within the cell housing, the oxidant reduction electrode module comprising an air chamber therein such that the exterior surface is facing said air chamber, and wherein the oxidant reduction electrode module is submerged, at least partially, within the electrolyte.

2. The electrochemical cell according to claim 1, wherein the at least one first battery electrode and the at least one second battery electrode are part of an electrode assembly, and wherein the electrode assembly is positioned apart from the oxidant reduction electrode, thereby defining a gap, and wherein said electrolyte is provided in the gap.

3. The electrochemical cell of claim 1, wherein the electrolyte is an ionically conductive liquid electrolyte.

4. The electrochemical cell of claim 1, wherein the at least one first battery electrode comprises a metal fuel and is configured at least partially within the electrolyte.

5. The electrochemical cell of claim 4, wherein the at least one first battery electrode comprises zinc.

6. The electrochemical cell of claim 1, wherein the at least one first battery electrode comprises a screen.

7. The electrochemical cell of claim 1, wherein said at least one first battery electrode comprises a plurality of first battery electrodes, and wherein the plurality of first battery electrodes are arranged in parallel planes.

8. The electrochemical cell of claim 7, wherein said at least one second battery electrode comprises a plurality of second battery electrodes, and wherein the plurality of second battery electrodes are arranged in parallel planes.

9. The electrochemical cell of claim 8, wherein at least one of the plurality of first battery electrodes is located between adjacent second battery electrodes.

10. The electrochemical cell of claim 9, wherein spacers are located between adjacent first battery electrodes and the second battery electrodes.

11. The electrochemical cell of claim 10, wherein the spacers are relatively spaced across the parallel planes of the first and second battery electrodes.

12. The electrochemical cell of claim 10, wherein each spacer includes a number of openings therein to allow electrolyte to freely flow within the cell housing and between the first and second battery electrodes.

13. The electrochemical cell of claim 8, wherein the first battery electrodes and the second battery electrodes are part of an electrode assembly, wherein the first battery electrodes and second battery electrodes are arranged in an alternating manner in the electrode assembly, such that each first battery electrode is between adjacent second battery electrodes.

14. The electrochemical cell of claim 13, further comprising a second oxidant reduction electrode provided in the cell housing, the second oxidant reduction electrode having a second interior surface contacting the electrolyte and an exterior surface for exposure to oxygen.

15. The electrochemical cell of claim 14, wherein the electrode assembly is spaced a first distance relative to the first oxidant reduction electrode and wherein the electrode assembly is spaced a second distance relative to the second oxidant reduction electrode.

16. The electrochemical cell of claim 15, wherein the first distance is different than the second distance.

17. The electrochemical cell of claim 15, wherein the first and second distances are between approximately 1 mm and approximately 15 mm, both inclusive.

18. The electrochemical cell of claim 1, comprising a spacer between the at least one first battery electrode and the at least one second battery electrode.

19. The electrochemical cell of claim 1, further comprising an oxygen evolving electrode provided in the cell housing that is configured to provide oxygen bubbles for mixing the electrolyte in the cell housing.

20. The electrochemical cell of claim 19, wherein the oxygen evolving electrode is positioned horizontally and orthogonal to and below the first and second battery electrodes within the cell housing.

21. The electrochemical cell of claim 1, comprising a plurality of first battery electrodes, a plurality of second battery electrodes, and a plurality of spacers configured in an electrode assembly, wherein said plurality of first battery electrodes, said plurality of second battery electrodes and said plurality of spacers are attached to said assembly, wherein said spacers are positioned between each of the first and second battery electrodes, wherein said assembly is provided in the cell housing and submerged, at least partially, within the electrolyte, and the cell further comprising a first terminal connected to the plurality of first battery electrodes and a second terminal connected to the plurality of second battery electrodes.

22. The electrochemical cell of claim 21, wherein the oxidant reduction electrode is a first oxidant reduction electrode and wherein the cell further comprises a second oxidant electrode provided in the cell housing with an interior surface contacting the electrolyte and an exterior surface for exposure to oxygen, the first oxidant electrode being provided on a first side of the electrode assembly and the second oxidant reduction electrode being provided on a second side of said electrode assembly, both of the first and second oxidant reduction electrodes being oriented essentially orthogonally to the at least one first and second battery electrodes.

23. The electrochemical cell of claim 21, further comprising a second electrode assembly in the cell housing, said second electrode assembly comprising a plurality of first battery electrodes, a plurality of second battery electrodes, and a plurality of spacers, wherein said spacers are positioned between each of the first and second battery electrodes of the second electrode assembly, and wherein said second electrode assembly is provided in the cell housing and submerged, at least partially, within the electrolyte.

24. The electrochemical cell of claim 1, wherein an oxygen evolving electrode is positioned above said oxidant reduction electrode and beneath said at least one first and second battery electrodes.

25. The electrochemical cell of claim 24, wherein the first battery electrode has a metal fuel electrodeposited thereon, and wherein the oxygen evolving electrode is also a catch tray for locally oxidizing particles of the metal fuel that have fallen from the first battery electrode.

26. The electrochemical cell of claim 25, wherein the metal fuel is zinc.

27. The electrochemical cell of claim 26, wherein the at least one second battery electrode has a reversible nickel species.

28. The electrochemical cell of claim 1, wherein the first battery electrode has a metal fuel electrodeposited thereon, and further comprising a catch tray for locally oxidizing particles of the metal fuel that have fallen from the first battery electrode.

* * * * *